United States Patent Office 2,755,380
Patented July 17, 1956

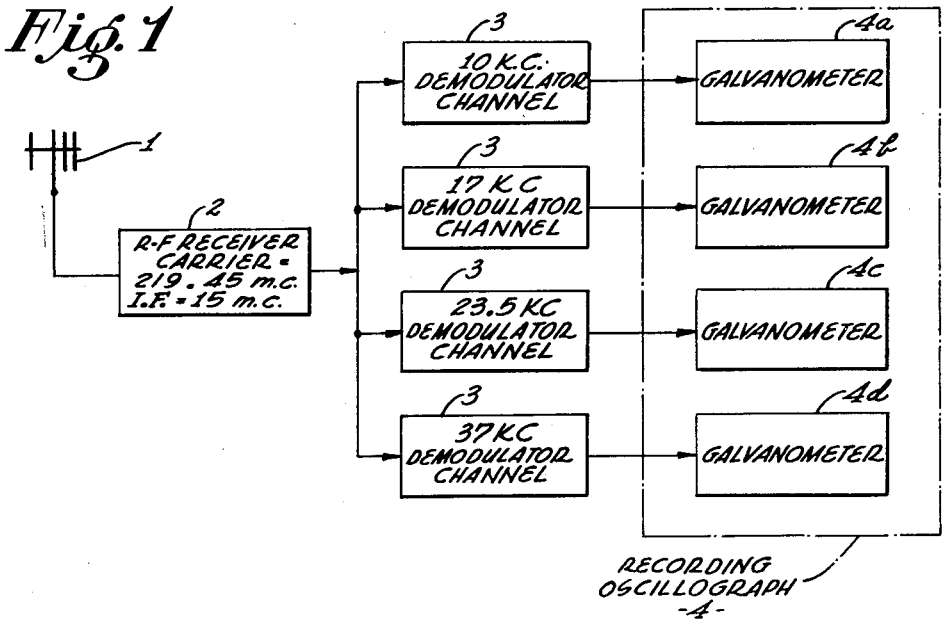
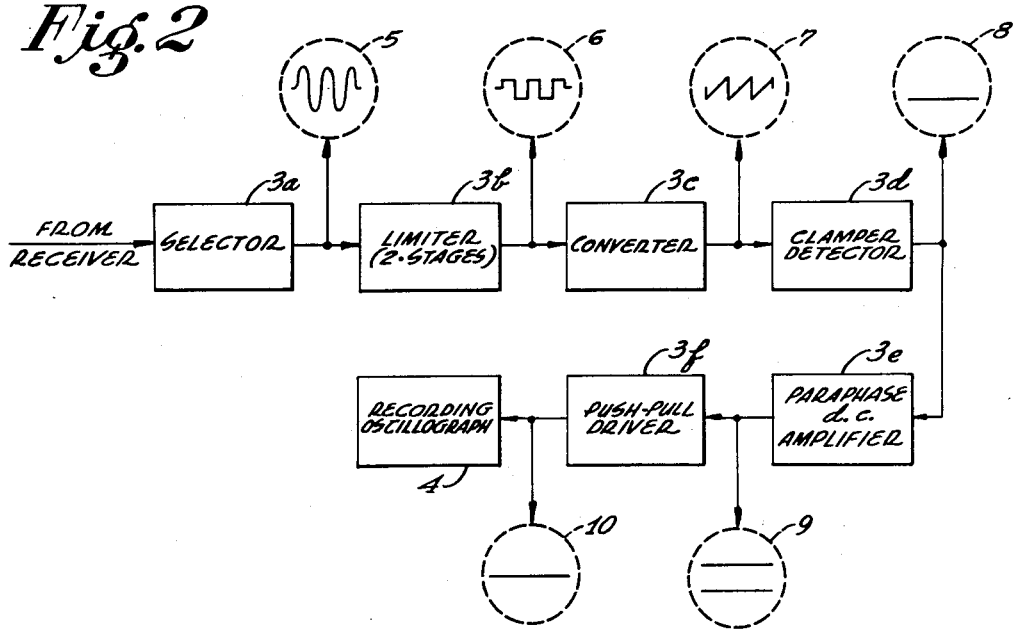

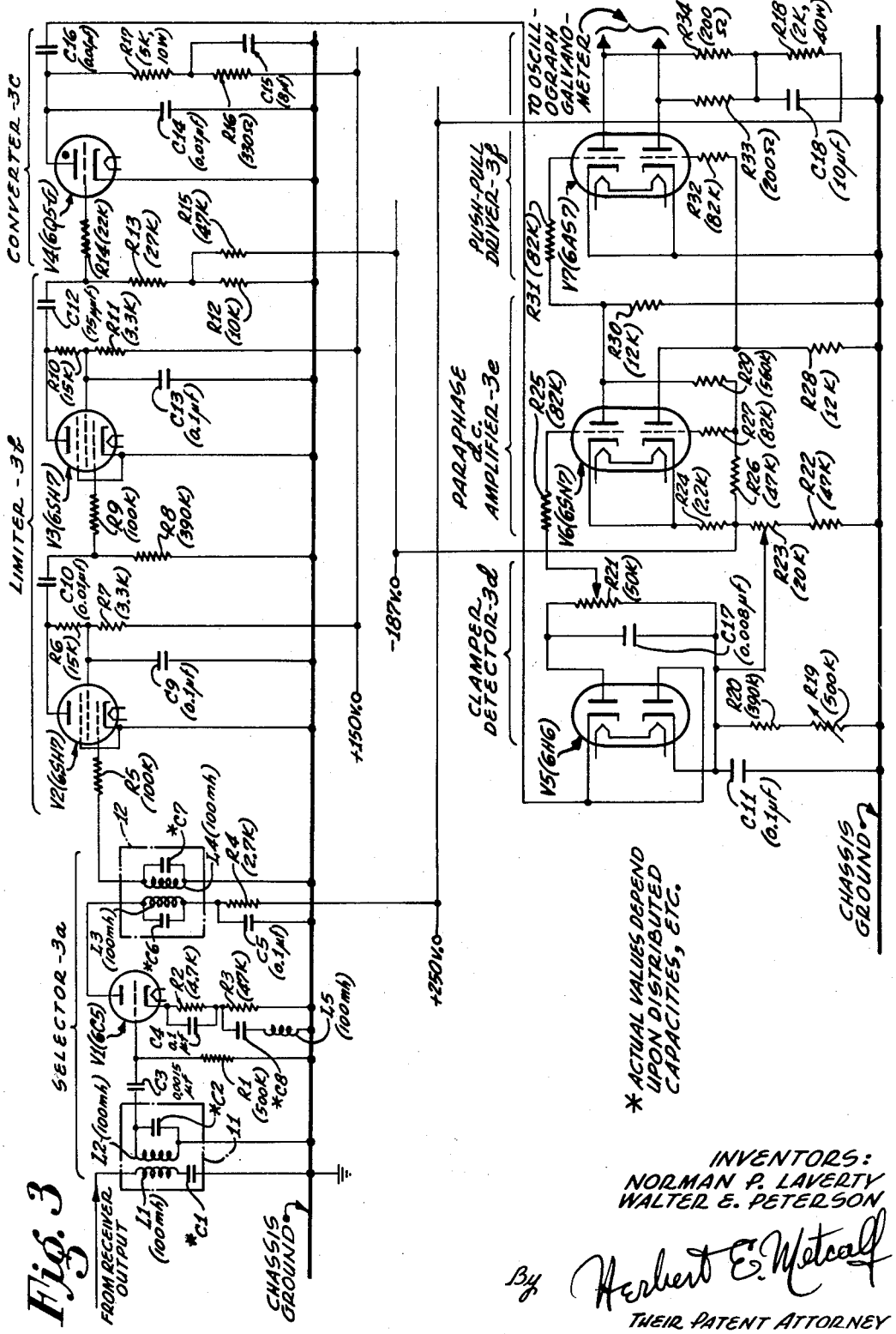

1

2,755,380
DEMODULATOR

Norman P. Laverty and Walter E. Peterson, Los Angeles, Calif., assignors to Northrop Aircraft, Inc., Hawthorne, Calif., a corporation of California Application January 20, 1951, Serial No. 207,037

6 Claims. (Cl. 250—27)

The present invention relates to demodulators, and more particularly to a peak sensing sawtooth generator demodulator. The invention is particularly adapted for use as a demodulator channel for a telemetering system.

In a telemetering system wherein accelerational data is transmitted from a moving vehicle to remote receiving equipment, for example, transducers are used to sense the accelerations which are to be telemetered. The transducers convert these accelerations into resistance variations which in turn cause frequency modulation of respective subcarriers by varying the frequency of oscillation of each subcarrier oscillator. The outputs of several subcarrier oscillator channels are mixed in a common network and fed to a modulator which, with the mixed output, will amplitude modulate a carrier generated by an R.-F. transmitter. The resulting signal is radiated to the recording station.

A receiving antenna at the recording station picks up the amplitude modulated carrier and feeds it to a receiver which amplifies and detects the carrier to produce the several frequency modulated waves. The receiver output consisting of the several detected waves (still mixed) is fed to several demodulator channels, each of which is tuned to accept one of the subcarrier frequencies and to reject all others. The demodulator channels separate the frequency modulated waves and convert them into direct currents proportional to the original transducer-sensed accelerations and are used to drive individual galvanometers of a recording oscillograph.

Demodulator channels consisting of a tuned bandpass filter, amplifier, limiter, conventional discriminator and driver can be used to separate and demodulate the radio receiver output. However, good discriminator linearity depends on careful adjustment of primary and secondary Q's of the discriminator input transformer. Linearity is better if the Q's are small and the primary and secondary coils are closely coupled. Moreover, the output signals are small and hence minor non-linearity can be unduly reflected as large percentage signal error. The range of linear frequency response of such a system is also limited to a relatively narrow band.

It is an overall object of the present invention to provide an improved means and method of converting a varying frequency A. C. voltage into a D. C. voltage whose amplitude varies in accurate accordance with the frequency variations of the A. C. voltage.

A more specific object of this invention is to provide an FM demodulator having a linear amplitude response relation to frequency variation, over a wide frequency range.

Still another object of the present invention is to provide an FM demodulator which produces a larger amplitude detected signal from the FM wave than presently known equipment, thus requiring less additional D. C. amplification and thereby reducing the final error due to any minor non-linearity and/or instability of a complex high-gain system.

In a telemetering system, as mentioned above, several FM signal waves are mixed with a single AM carrier.

2

After first detection to remove the carrier, the various FM channels must be properly separated for respective demodulation in individual circuits without resulting in cross modulation and the like. Therefore, another object of this invention is to provide novel broad band selector means, in a demodulator for an FM telemetering system, for respectively separating several subcarrier frequency bands from each other and accepting each entire subcarrier in a different circuit.

Briefly, the foregoing objects and other objects ancillary thereto are accomplished in our invention by converting the FM signal wave into a peaked waveform, utilizing the peaked waveform to control, by the spacing of the peaks, the amplitude of a sawtooth wave, and detecting the sawtooth peaks to produce a D. C. voltage linearly proportional to the varying amplitude of the sawtooth wave. The pulse peaks are preferably used to control the amplitude variation of a large signal amplitude output circuit requiring a relatively small amount of further D. C. amplification. Selecting between several mixed FM subcarriers prior to this demodulation is accomplished with a separate selector stage having tuned degeneration and selective coupling both at the input and output of this stage.

The invention possesses numerous other objects and features, some of which, together with the foregoing, will be set forth in the following description of a preferred embodiment of the invention and the invention can be more fully understood by reference to the attached drawings, in which:

Figure 1 is a schematic block diagram of the receiving system of a four channel telemetering system.

Figure 2 is a block diagram of one demodulator channel of Figure 1 which also shows various waveforms at each stage for a steady-signal condition.

Figure 3 is a schematic wiring diagram of a preferred demodulator channel for a telemetering system.

Reference is first made to the block diagram of the receiving and recording equipment for use in a telemetering system, Figure 1.

In short, the receiving system, for example, consists of a directional and rotatable Yagi receiving antenna 1 which picks up an amplitude modulated carrier from a remote transmitting station and directs it to an R.-F. superheterodyne receiver 2 that amplifies and then detects the carrier to reproduce several subcarrier frequency-modulated waves (in this case four) with which the main carrier was modulated. The receiver output is fed to four demodulator channels 3, center-operating at frequencies of 10, 17, 23.5 and 37 kc., for example. These demodulator channels convert and amplify the input sine waves to D. C. signals of sufficient magnitude to drive respective galvanometers $4a$, $4b$, $4c$ and $4d$ of a recording oscillograph 4.

Now referring to Figure 2, the demodulator channels 3 are composed of and perform according to the diagrammatic representation shown. A medium gain amplifier with tuned bandpass filters in both its grid and plate circuits provides a selector $3a$ which chooses the correct subcarrier frequency. The selector sine wave output 5 is converted into a square wave 6 of constant amplitude by a two-stage limiter $3b$ for a converter stage $3c$. This stage is comprised of a differentiating circuit and a thyratron sawtooth generator. The differentiating circuit forms sharp pulses spaced to the frequency of the selected subcarrier wave. The spacing of these pulses controls the thyratron discharge interval and determines the peak amplitude of a generated sawtooth wave 7 by permitting a charging condenser to periodically discharge. To detect the peak amplitude of the sawtooth wave 7, a clamper-detector stage $3d$ employs one diode of a twin diode; the other diode detects the peak value of the sawtooth wave as a proportional D. C. signal 8 whose value is inversely proportional to the subcarrier frequency. The D. C. voltage 8 is amplified and phase inverted by a paraphase D. C. amplifier 3e producing a dual D. C. output 9 to a push-pull driver 3f which provides D. C. power 10 to drive a galvanometer of the recording oscillograph 4 in accordance with the frequency change of the subcarrier frequency.

A detailed description of a demodulator channel is shown in Figure 3. Values of circuit parameters are given for a preferred 10 kc. frequency subcarrier channel, for example.

The receiver output, which consists of several mixed frequency-modulated subcarrier waves, is fed to a tuned bandpass filter 11 with a series combination of inductance L1 and capacity C1 input, and a parallel combination of inductance L2 and capacity C2 output. The capacity C3 and resistance R1 provides coupling to a medium gain triode amplifier V1. C4 and C5 are bypass condensers and cathode resistors R2 and R3 provide grid bias. The series tuned circuit composed of condensers C8 and inductance L5 is shunted across resistor R3 to give degeneration at all but the subcarrier frequency. The plate circuit of tube V1 forms part of a bandpass filter 12 of parallel input inductance L3 and capacity C6 coupling with a parallel output combination of inductance L4 and capacity C7. Plate voltage is supplied for this stage through a voltage dropping resistor R4 from a 250 volt potential. The bandwidth of this selector is 8 percent of the center frequency, for example.

The selected sine wave output 5 (Figure 2) of the selector stage 3a is converted into a constant amplitude square wave 6 by means of the two-stage limiter 3b employing pentodes V2 and V3 of sharp cutoff characteristics, low plate load resistances R6 and R10, and high series grid limiting resistances R5 and R9. Resistors R7 and R11 drop the voltage for the screen grids to a low value for better limiting. C9 and C13 are bypass condensers, and resistor R8 and condenser C10 provide coupling between first and second limiters.

The converter stage converts frequency into peak voltage amplitude. Capacity C12 and resistance R13 function in a differentiating circuit or peaker, and produce sharp pulses which fire the thyratron V4 for each pulse greater than cutoff, and R12 and R15 provide the negative cutoff bias to the grid of V4 through the grid limiting resistor R14 which prevents excessive grid current. When the thyratron tube V4 is cut off, the sawtooth generating condenser C14 is building up its charge (approaching the supply voltage) through the resistor R17. Each time the thyratron fires, the condenser C14 is discharged immediately. Thus the spacing of the pulses determines the peak amplitude of the sawtooth 7 and this voltage is inversely proportional to the subcarrier frequency. Plate voltage for the thyratron is obtained through resistor R16, and C15 is a bypass condenser.

The condenser C16 couples the converter stage to a clamper-detector stage which utilizes a twin diode V5. One section (shown as the top diode) is the detector functioning as a negative rectifying diode where the capacity C17 and resistance R21 form the detection load circuit. The other section (lower diode) is a negative clamping diode wherein an adjustable clamp level is provided by a coarse galvanometer balance adjustment with a variable resistor R23, in series with resistor R22, which controls the −187 volt level, and is used for zero-adjustment of the output indicating instrument. The resistor R20 in series with variable resistor R19 gives a fine galvanometer balance adjustment by varying the parallel resistance to ground. Capacity C11 is a bypass condenser.

The negative output 8 (Figure 2) of the detector (which comes from a sensitivity control on the load resistance R21) is applied through series grid resistor R25 to the grid of one section of a twin triode V6 paraphase D. C. amplifier. The two cathodes are tied together and maintained at a fixed negative potential through a cathode resistor R24. The plate load resistors R28 and R30 are connected to ground. The plate of the signal-receiving triode section is connected to the grid of the second triode section through a grid resistor R27 which is tied between voltage division resistors R29 and R26. The resistor R26 is also connected to the fixed negative voltage. As the grid of the signal triode rises in potential, the plate potential drops and consequently the second triode grid will also drop an equal amount as the first grid rises if the proper resistances of the voltage dividing resistors are selected. Thus the plate voltage of the second triode will rise an equal amount that the first triode plate drops and a push-pull voltage 9 is provided for the driver V7.

The grids of the push-pull driver V7 are connected to the plates of the D. C. amplifier V6 through grid limiting resistors R31 and R32. Plate voltage is applied through resistor R18 to the two plates of the twin triode V7 through the plate load resistors R33 and R34. Capacity C18 is a bypass condenser. Leads connected to the two plates of V7 supply a push-pull signal 10 to drive a galvanometer of the recording oscillograph 4.

The invention thus converts sine waves into square waves which are independent of variations in amplitude of input signals and uses the frequency of input signals to control the relatively large output of a thyratron sawtooth generator in such a manner that the detected peak amplitude is proportional to the input frequency. A D. C. phase inverter or paraphase D. C. amplifier provides push-pull voltages for driving an oscillograph galvanometer which may be connected having the proper polarity to register positive and negative values of the data being received.

As will be apparent to those skilled in the art, other sawtooth generating means can be used in place of the thyratron tube circuit under control of the pulse peaks from the differentiating circuit, such as a multivibrator, for example. Another means which will operate suitably is a conventional vacuum tube biased to cut-off, having a load capacitor, for example, across which the integrated value of voltage from the pulse-produced discharge current is taken. An important feature as taught herein is the means for changing the sine wave, or other input, into a peaked wave where the pulse peaks have the original frequency, so that by supplying a preferred means for "counting" or integrating the results of these pulses, a current or voltage is produced which is accurately linearly related to the changes of input frequency.

From the above description it will be apparent that there is thus provided a device of the character described possessing the particular features of advantage before enumerated as desirable, but which obviously is susceptible of modification in its form, proportions, detail construction, and arrangement of parts without departing from the principles involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. Means for obtaining a direct current voltage from a square waveform of varying frequency which comprises differentiating means connected to form a peaked pulse waveform from said square waveform, sawtooth generating means connected to be triggered by said peaked pulse waveform and having a predetermined time constant such that a linear sawtooth wave is produced, the amplitude of which is proportional to the varying frequency of said square waveform, detector means connected to produce said varying magnitude direct current voltage in accordance with the variations in amplitude of said linear sawtooth wave and adjustable direct current clamping means connected for establishment of a reference level of said direct current voltage.

2. Apparatus in accordance with claim 1 wherein said detector means and said clamping means comprises a twin diode, one section of which is the detector means connected to function as a negative voltage rectifying diode and the other section is the clamping means connected to establish a negative voltage clamp level for the rectified negative voltage.

3. A frequency modulation demodulator comprising means for changing an alternating current wave of varying frequency into a square wave of the same frequency, a differentiating circuit for producing a differentiated waveform from said square wave, a thyratron converter connected to be triggered by said differentiated waveform and adapted to produce a sawtooth wave having an amplitude proportional to the varying frequency of said square wave, detector means connected to produce a direct current waveform, the magnitude of which varies in accordance with said sawtooth amplitude and adjustable direct current clamping means connected to establish a reference level for said direct current waveform.

4. Apparatus in accordance with claim 3 wherein said clamping means comprises a diode and adjustable resistance means connected in series therewith for varying a negative voltage bias provided to said diode, whereby said reference level is adjustable.

5. Apparatus in accordance with claim 3 including high fidelity, sensitive amplifying output means for adapting said direct current waveform to drive an indicating instrument in accordance with the frequency of said alternating current wave.

6. Apparatus in accordance with claim 3 including a paraphase direct current amplifier and push-pull output means connected to carry said direct current waveform, and a signal indicating instrument connected to said output means, said instrument being adapted to be zero-centered to indicate frequency deviations of said alternating current wave above and below a central value.

References Cited in the file of this patent
UNITED STATES PATENTS

| | | |
|---|---|---|
| 2,349,261 | Ginzton | May 23, 1944 |
| 2,426,778 | Long | Sept. 2, 1947 |
| 2,467,775 | Posthumus | Apr. 19, 1949 |
| 2,471,427 | Grieg | May 31, 1949 |
| 2,494,370 | Swartzel et al. | Jan. 10, 1950 |
| 2,500,536 | Goldberg | Mar. 14, 1950 |
| 2,510,983 | Krause | June 13, 1950 |
| 2,525,046 | Richter | Oct. 10, 1950 |
| 2,530,081 | Ross | Nov. 14, 1950 |
| 2,562,913 | Heeren | Aug. 7, 1951 |
| 2,563,816 | Butman | Aug. 14, 1951 |